United States Patent
Huang et al.

(10) Patent No.: US 8,583,849 B2
(45) Date of Patent: Nov. 12, 2013

(54) SIGNAL SWITCH CONNECTOR SET APPLIED TO MOTHERBOARD OF COMPUTER SYSTEM

(75) Inventors: Pai-Ching Huang, Taipei (TW); Li-Chien Wu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 239 days.

(21) Appl. No.: 13/244,642

(22) Filed: Sep. 25, 2011

(65) Prior Publication Data

US 2012/0079158 A1 Mar. 29, 2012

(30) Foreign Application Priority Data

Sep. 29, 2010 (TW) ................................ 99133067 A

(51) Int. Cl.
*G06F 13/00* (2006.01)
*G06F 13/40* (2006.01)

(52) U.S. Cl.
CPC .................................. *G06F 13/4022* (2013.01)
USPC .............................. 710/316; 710/17; 710/300

(58) Field of Classification Search
USPC ..................... 710/300–317, 8–19, 104–110
See application file for complete search history.

(56) References Cited

U.S. PATENT DOCUMENTS

| | | | | | |
|---|---|---|---|---|---|
| 6,256,700 | B1 * | 7/2001 | Sauber | | 710/316 |
| 7,085,876 | B2 * | 8/2006 | Lai et al. | | 710/313 |
| 7,836,241 | B2 * | 11/2010 | Perng et al. | | 710/313 |
| 2006/0075152 | A1 * | 4/2006 | Zhu | | 710/15 |
| 2009/0019192 | A1 * | 1/2009 | Yeh | | 710/52 |
| 2009/0327540 | A1 * | 12/2009 | Robertson et al. | | 710/104 |
| 2010/0262726 | A1 * | 10/2010 | Tauscher et al. | | 710/16 |
| 2011/0219272 | A1 * | 9/2011 | Lai et al. | | 714/54 |
| 2013/0013842 | A1 * | 1/2013 | Numamoto et al. | | 710/316 |
| 2013/0073777 | A1 * | 3/2013 | Monks et al. | | 710/316 |

FOREIGN PATENT DOCUMENTS

CN 2770151 4/2006
CN 201122740 9/2008

* cited by examiner

*Primary Examiner* — Raymond Phan
(74) *Attorney, Agent, or Firm* — Jianq Chyun IP Office

(57) ABSTRACT

A signal switch connector set is disposed on a motherboard of a computer system. The signal switch connector set is capable of selectively connecting a USB 3.0 signal terminal of a south bridge chip to a USB 3.0 port located at the rear panel of a casing or connecting the USB 3.0 terminal of the south bridge chip to the USB 3.0 port located at the front panel of the casing.

11 Claims, 5 Drawing Sheets

SIGNAL SWITCH CONNECTOR SET APPLIED TO MOTHERBOARD OF COMPUTER SYSTEM

CROSS-REFERENCE TO RELATED APPLICATION

This application claims the priority benefit of Taiwan application serial no. 99133067, filed on Sep. 29, 2010. The entirety of the above-mentioned patent application is hereby incorporated by reference herein and made a part of this specification.

BACKGROUND OF THE INVENTION

1. Field of the Invention

The invention relates to a signal switch connector set and, more particularly, to a signal switch connector set applied at a motherboard.

2. Description of the Related Art

Universal serial bus (USB) is a serial port bus standard and is also an input/output (I/O) interface technology specification. It is widely used in communication products such as a personal computer and a mobile device.

The main feature of the USB is that it supports hot plug and plug-and-play. When a USB device is inserted into a computer system, a motherboard automatically loads a drive program needed by the USB device. Thus, it is more convenient in usage than other buses such as a peripheral component interconnect (PCI).

Most computer system includes multiple USB ports. FIG. 1A is a schematic diagram showing a front panel of a casing 12 of a conventional computer system 10. The front panel of the casing 12 of the computer system 10 usually includes a power switch 102 and an optical disk drive (ODD) 104 thereon, and it also includes multiple USB ports thereon. As shown in FIG. 1A, the front panel of the casing 12 of the computer system 10 includes two USB ports 106 and 108 thereon.

FIG. 1B is a schematic diagram showing a rear panel of the casing 12 of the conventional computer system 10. Generally, the rear panel of the casing 12 of the computer system 10 usually includes a power socket 114 and various input/output (I/O) ports thereon, such as a network port 116, an earphone port 118, a microphone port 120, a mouse port 122, a keyboard port 124 and two USB ports 126 and 128.

FIG. 2 is a schematic diagram showing a motherboard disposed at the conventional computer system 10. The motherboard 20 includes a central processing unit (CPU) 202, a north chip 204, the south bridge chip 206, two USB port connectors 210, two USB ports 126 and 128 thereon. The south bridge chip 206 provides four groups of USB signals, two groups of the USB signals are transmitted to the two USB ports 126 and 128, and the other two groups of the USB signals are transmitted to other USB ports outside the motherboard 20 via the two USB port connectors 210.

As shown in FIG. 1B, the USB ports 126 and 128 at the rear panel of the casing 12 are fixed at the margin of the motherboard 20. That is, in FIG. 2, the USB ports 126 and 128 at the margin of the motherboard 20 are fixed at the rear panel of the casing 12 through holes (not shown) at the rear panel of the casing 12 of the computer system 10 in FIG. 1B. Moreover, the two USB port connectors 210 may be connected to two USB ports, as shown in FIG. 2, two USB port connectors 210 may be connected to the USB ports 106 and 108 at the front panel of the casing 12 in FIG. 1A via a USB cable (not shown), and two USB port connectors 210 may be connected to the south bridge chip 206 via layout traces 232 at the motherboard. The USB ports 126 and 128 may be connected to the south bridge chip 206 via layout traces 236 at the motherboard.

FIG. 3 is a schematic diagram showing a motherboard in a casing of a computer system. As shown in FIG. 3, the USB ports 106 and 108 at the front panel of the casing 12 may be connected to the two USB port connectors 210 via a USB cable 250. Moreover, the USB ports 126 and 128 at the margin of the motherboard 20 are directly fixed at the rear panel of the casing 12 of the computer system 10.

As shown in FIG. 3, a USB device (such as a USB drive which is not shown) inserted into the USB port 106 or 108 can communicate with the south bridge chip 206 via the USB cable 250, two USB port connectors 210 and the motherboard layout traces 232. A USB device (not shown) inserted into the USB port 126 or 128 can communicate with the south bridge chip 206 via motherboard layout traces 236.

The data transmitting speed of USB is continuously improved. The maximum transmitting speed of USB 1.1 is 12 Mbps, and the maximum transmitting speed of USB 2.0 is 480 Mbps. The maximum transmitting speed of USB 3.0 promoted recently exceeds 4.8 Gbps. However, since USB 3.0 is not widely used and its price is relative high, the number of the USB 3.0 ports provided by the south bridge chip 206 at the motherboard is small (such as only two USB 3.0 ports are provided). Thus, the number of the USB ports at the casing may be much larger than that of the USB 3.0 ports disposed at the motherboard.

Taking FIG. 3 as an example, it is assumed that the south bridge chip 206 only provides two USB 3.0 ports, and thus if the two USB 3.0 ports are directly disposed at the rear panel of the casing 12 via the motherboard layout traces 236, the motherboard layout traces 232, the USB port connector 210, and the USB cable 250 are not need to be disposed on the motherboard 20. However, the USB ports at the front panel of the casing 12 cannot communicate with any USB devices. That is, if the user needs to use the USB 3.0 port, he or she needs to connect the USB device to the rear panel of the casing, which is rather inconvenient.

BRIEF SUMMARY OF THE INVENTION

A signal switch connector set at a motherboard of a computer system is provided. It can transmit the signal from a south bridge chip to a USB port located at the rear panel of a casing or the front panel of the casing according to the user requirement.

A signal switch connector set includes a first metal element electrically connected to a chip of a motherboard; a second metal element electrically connected to a first input/output (I/O) port of the motherboard; a first inserting element, and a second inserting element. The first inserting element includes a first conducting component, and when the first inserting element is inserted between the first metal element and the second metal element, the first conducting component electrically connects the first metal element and the second metal element to make the chip electrically connected to the first I/O port. The second inserting element includes a second conducting component connected to a signal line, and the signal line is connected to a second I/O port outside the motherboard. When the second inserting element is inserted between the first metal element and the second metal element, the second conducting component electrically connects the first metal element and the signal line to make the chip electrically connected to the second I/O port.

A motherboard includes a chip generating a chip signal; a first trace whose first end is connected to the chip; a first I/O port; a second trace whose first end is connected to the first I/O port; and a signal switch connector set. The signal switch connector set includes a first metal element connected to a second end of the first trace; a second metal element connected to a second end of the second trace; a first inserting element, and a second inserting element. The first inserting element includes a first conducting component. When the first inserting element is inserted between the first metal element and the second metal element, the first conducting component electrically connects the first metal element and the second metal element to transmit the chip signal to the first I/O port. The second inserting element includes a second conducting component connected to a signal line, the signal line is connected to a second I/O port of the motherboard, and when the second inserting element is inserted between the first metal element and the second metal element, the second conducting component electrically connects the first metal element and the signal line to transmit the chip signal to the second I/O port.

A computer system includes an external I/O port; a signal line whose one end is connected to the external I/O port; and a motherboard. The motherboard includes a chip generating a chip signal; a first trace whose first end is connected to the chip; a first I/O port disposed at the motherboard; a second trace whose first end is connected to the first I/O port; and a signal switch connector set. The signal switch connector set includes a first metal element connected to a second end of the first trace; a second metal element connected to a second end of the second trace; and a first inserting element. The first inserting element includes a first conducting component, and when the first inserting element is inserted between the first metal element and the second metal element, the first conducting component electrically connects the first metal element and the second metal element to transmit the chip signal to the first I/O port. The second inserting element includes a second conducting component connected to the signal line, the signal line is connected to the external I/O port, and when the second inserting element is inserted between the first metal element and the second metal element, the second conducting component electrically connects the first metal element and the signal line to transmit the chip signal to the external I/O port.

These and other features, aspects and advantages of the present invention will become better understood with regard to the following description, appended claims, and accompanying drawings.

DETAILED DESCRIPTION OF THE EMBODIMENTS

A signal switch connector set disposed on a motherboard is used to selectively connect a USB 3.0 port of a south bridge chip to a USB 3.0 port at a rear panel of a casing or a USB 3.0 port at a front panel of the casing.

Figure 1A:
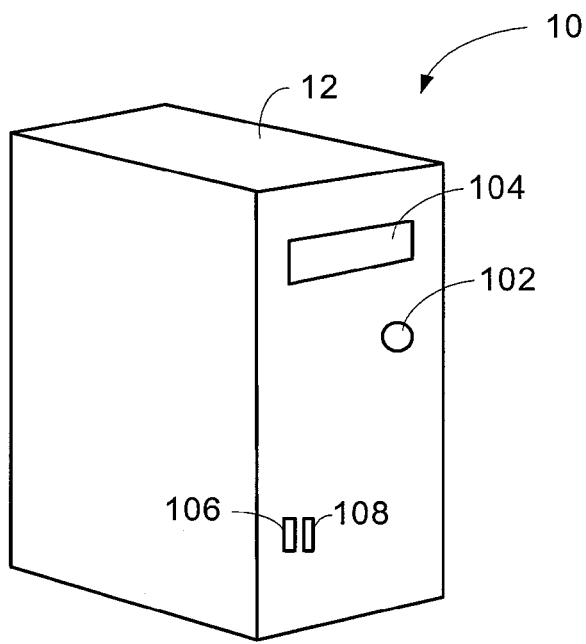
FIG. 1A is a schematic diagram showing a front panel of a conventional computer system casing.
Figure 1B:
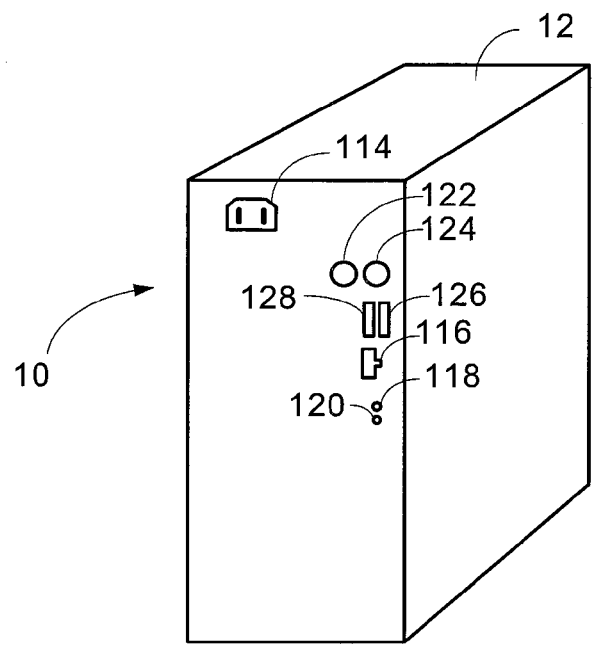
FIG. 1B is a schematic diagram showing a rear panel of a conventional computer system casing.
Figure 2:
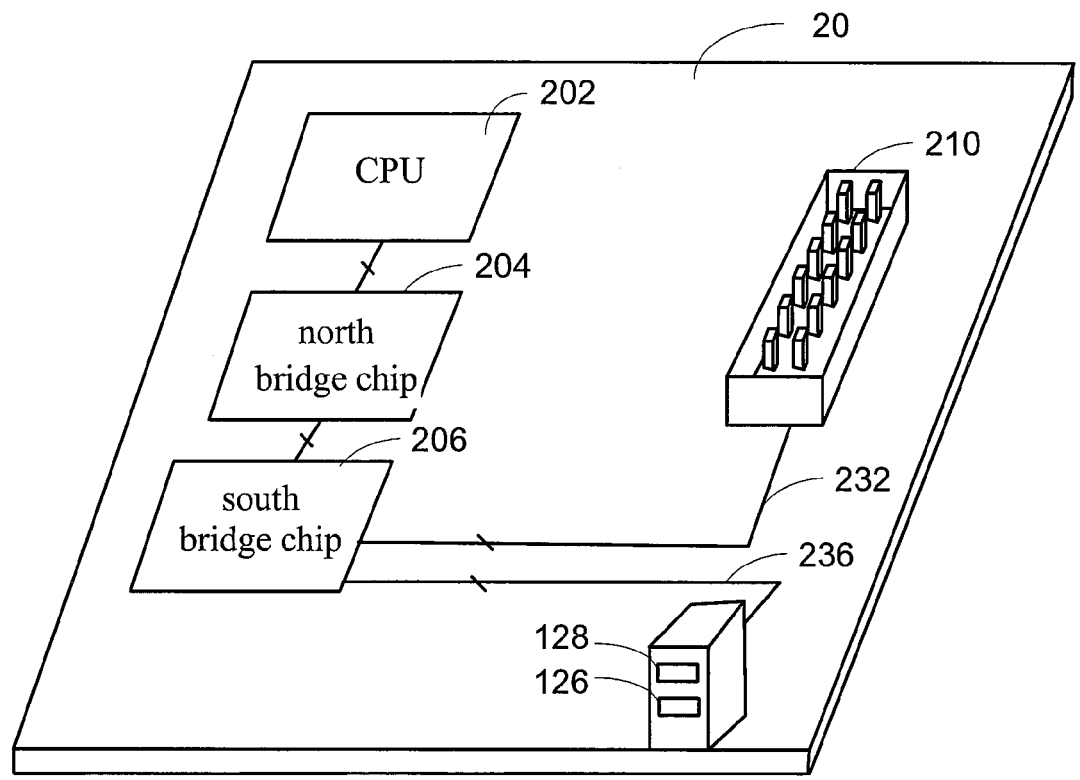
FIG. 2 is a schematic diagram showing a motherboard disposed in a conventional computer system.
Figure 3:
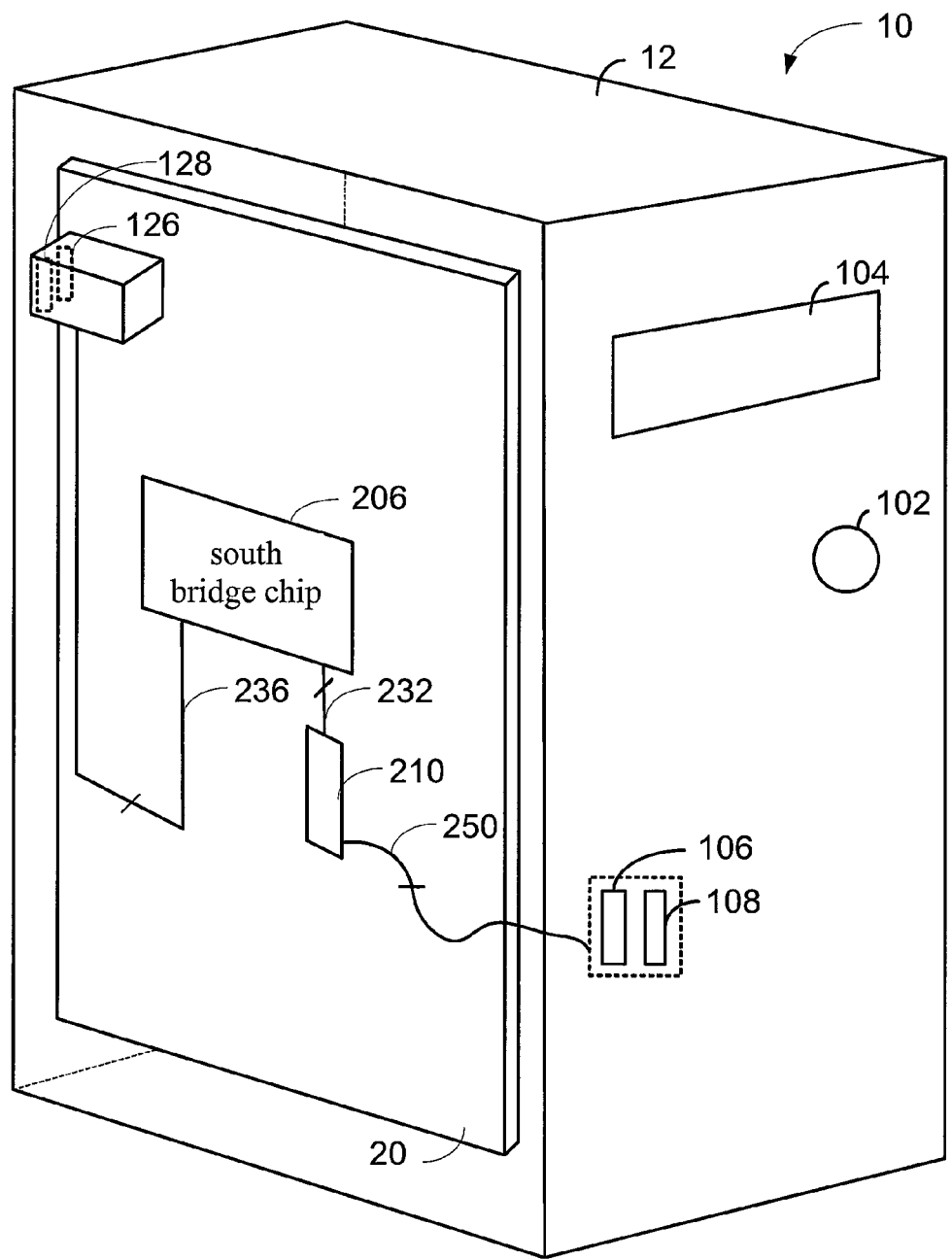
FIG. 3 is a schematic diagram showing a motherboard of a conventional computer system casing.
Figure 4:
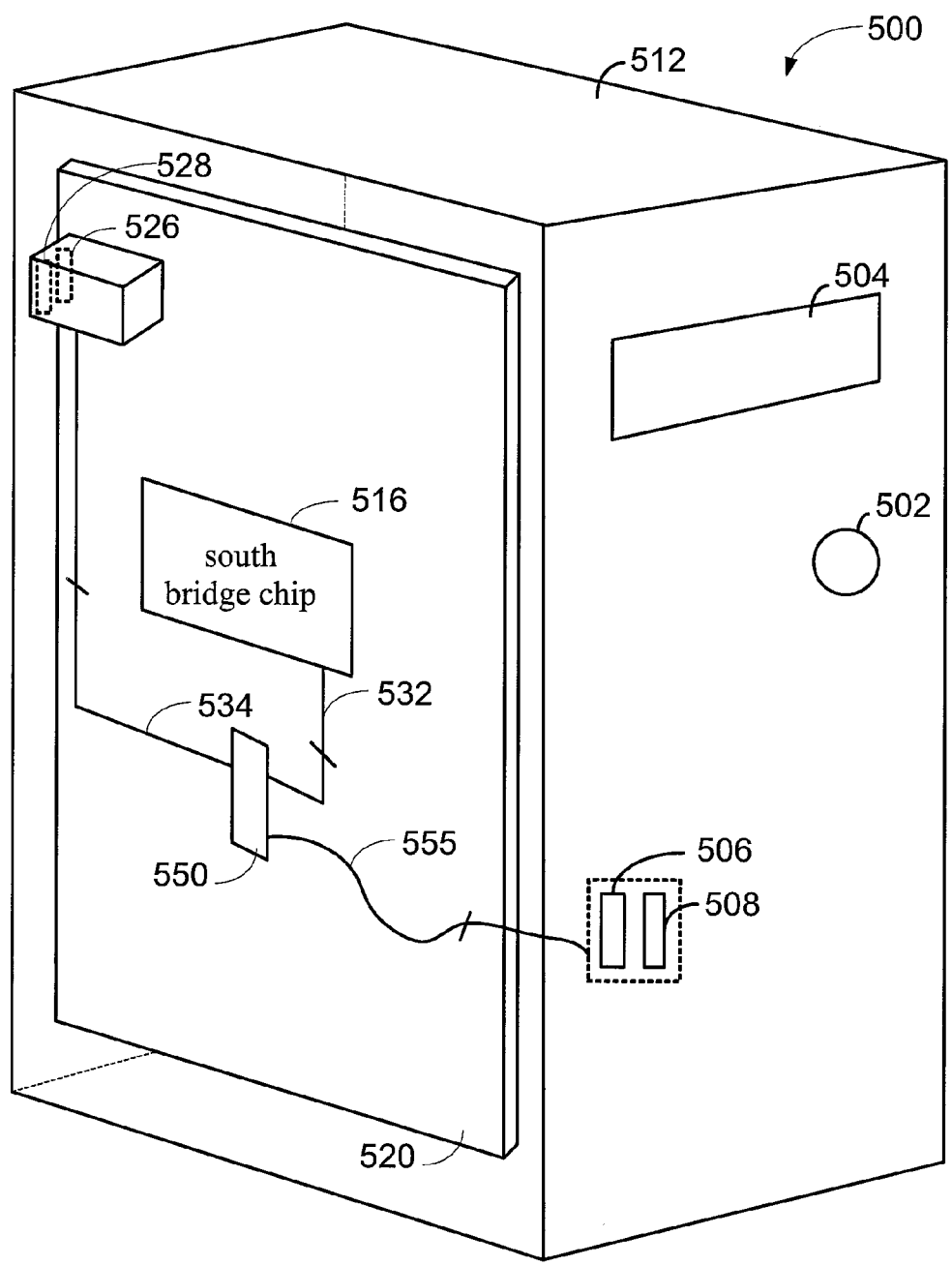
FIG. 4 is a schematic diagram showing a signal switch connector set disposed at the motherboard.

FIG. 4 is a schematic diagram showing a signal switch connector set 550 disposed on a motherboard 520. Besides a power switch 502 and an ODD 504, multiple USB 3.0 ports 506 and 508 are also disposed at the front panel of a casing 512 of a computer system 500. The motherboard 520 of the computer system 500 includes a south bridge chip 516, the signal switch connector set 550 and USB 3.0 ports 526 and 528 thereon. The USB 3.0 ports 526 and 528 are disposed at the margin of the motherboard 520 and fixed at the rear panel of the casing 512.

According to the embodiment, the signal switch connector set 550 is disposed on the motherboard 520. The signal switch connector set 550 may connect a USB 3.0 signal terminal of the south bridge chip 516 to the USB 3.0 ports 526 and 528 at the rear panel of the casing 512 or to the USB 3.0 ports 506 and 508 at the front panel of the casing 512 by a manual switching.

In other words, when the user selects to connect the USB 3.0 signal terminal of the south bridge chip 516 to the USB 3.0 ports 526 and 528 at the rear panel of the casing 512, the USB 3.0 signal terminal of the south bridge chip 516 is connected to the signal switch connector set 550 via the first motherboard layout trace 532, and the signal switch connector set 550 is connected to a signal terminal of the USB 3.0 ports 526 and 528 via the second motherboard layout trace 534. On the contrary, when the user selects to connect the USB 3.0 signal terminal of the south bridge chip 516 to the USB 3.0 ports 506 and 508 at the front panel of the casing 512, the USB 3.0 signal terminal of the south bridge chip 516 is connected to the signal switch connector set 550 via the first motherboard layout trace 532, and the signal switch connector set 550 is connected to the signal terminal of the USB 3.0 ports 506 and 508 via a USB signal line 555.

According to the embodiment, the signal switch connector set 550 is connected to the motherboard 520 via the surface mounted technology (SMT). The signal switch connector set 550 can operate at a bypass mode and a switch mode, and the operating mode switch of the signal switch connector set 550 may be controlled by the user manually. Furthermore, when the signal switch connector set 550 operates at the bypass mode, a signal from the south bridge chip 516 is transmitted to the USB 3.0 ports 526 and 528 via the signal switch connector set 550. When the signal switch connector set 550 operates at the switch mode, the signal from the south bridge chip 516 is transmitted to another path, such as the USB 3.0 ports 506 and 508 at the front panel of the casing 512, via the signal switch connector set 550.

Figure 5A:
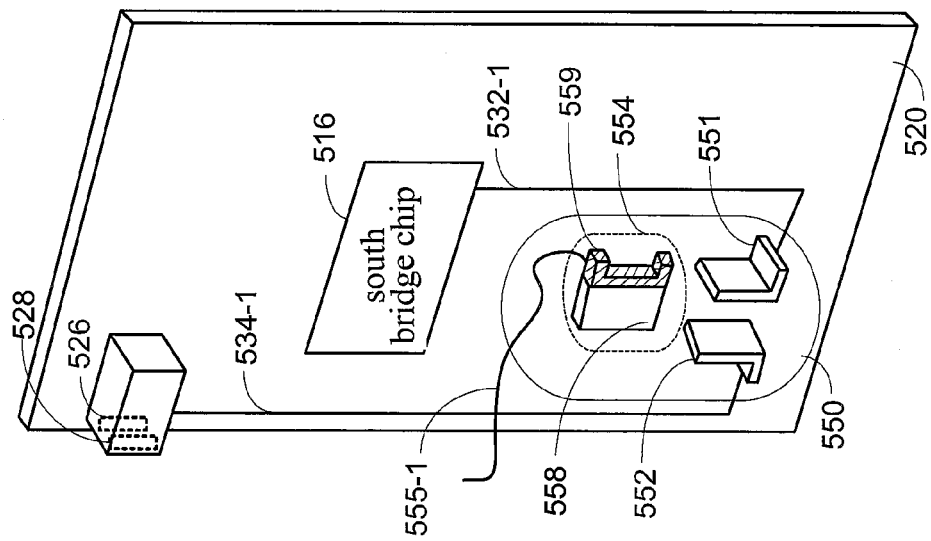
FIG. 5A is a schematic diagram showing that a signal switch connector set disposed at a motherboard operates at a bypass mode.

FIG. 5A is a schematic diagram showing that the signal switch connector set 550 fixed on the motherboard 520 operates at the bypass mode. To illustrate more conveniently, a single signal from the USB 3.0 port is taken as an example. The method for switching multiple signal lines of multiple signals is also the same.

The signal switch connector set 550 includes a first L-shaped metal element 551, a second L-shaped metal element 552, and a first inserting element 553. The first L-shaped metal element 551 and the second L-shaped metal element 552 may be welded to the motherboard 520 via the SMT or any other technology as long as they can be fixed on the motherboard 520. Moreover, a first metal trace 532-1 is connected between the south bridge chip 516 and the first L-shaped metal element 551; a second metal trace 532-1 is connected between the second L-shaped metal element 552 and the USB 3.0 port 526. The first inserting element 553 includes a first insulating body 556 and a first conducting component 557. When the first inserting element 553 is inserted between the first L-shaped metal element 551 and the second L-shaped metal element 552, the first conducting component 557 electrically connects the first L-shaped metal element 551 and the second L-shaped metal element 552. Thus, the south bridge chip 516 and the USB 3.0 port 526 at the rear panel of the casing are electrically connected. That is, the signal switch connector set 550 operates at the bypass mode.

Figure 5B:
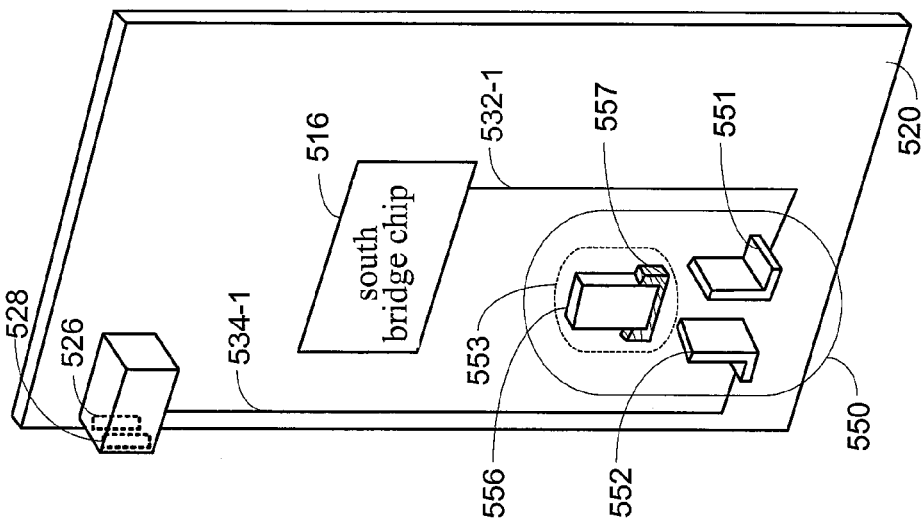
FIG. 5B is a schematic diagram showing that a signal switch connector set disposed at a motherboard operates at a switch mode.

FIG. 5B is a schematic diagram showing that the signal switch connector set 550 fixed on the motherboard 520 operates at the switch mode. The signal switch connector set 550 further includes a second inserting element 554. The second inserting element 554 includes a second insulating body 558 and a second conducting component 559, one end of the second conducting component 559 is connected to a USB signal line 555-1, and the USB signal line 555-1 is connected to the USB 3.0 port (not shown) at the front panel of the casing 512. Consequently, when the second inserting element 554 is inserted between the first L-shaped metal element 551 and the second L-shaped metal element 552, the second conducting component 559 electrically connects the first L-shaped metal element 551 and the USB signal line 555-1. Thus, the south bridge chip 516 and the USB 3.0 port (not shown) at the front panel of the casing 512 are electrically connected. That is, the signal switch connector set 550 operates at the switch mode.

In sum, when the user wants to use the USB 3.0 ports 526 and 528 at the rear panel of the casing, the user controls the signal switch connector set 550 to operate at the bypass mode. Thus, the signal from the south bridge chip 516 is transmitted to the USB 3.0 ports 526 and 528 at the rear panel of the casing via the signal switch connector set 550. When the user uses the USB 3.0 port at the front panel of the casing, the user controls the signal switch connector set 550 to operate at the switch mode. Thus, the signal from the south bridge chip 516 is transmitted to the USB 3.0 port (not shown) at the front panel of the casing via the signal switch connector set 550. Consequently, when the number of the USB 3.0 connectors at the motherboard 520 is much smaller than that of the casing, the user may use the signal switch connector set 550 to switch between different operating modes to use the USB 3.0 port disposed at the front panel of the casing or disposed at the rear panel of the casing.

The USB 3.0 port is taken as an example, which is not limited herein. The signal switch connector set 550 may also be applied to USB 2.0 and USB 1.1 which have relative low data transmission speed. Moreover, other data transmitting device including high speed or low speed I/O ports can also use the signal switch connector set.

Furthermore, the first inserting element 553 and the second inserting element 554 of the signal switch connector set 550 may be integrated to a single inserting element, and the inserting element includes two separate conducting elements. One conducting element allows the signal switch connector set to operate at the bypass mode, and the other conducting element allows the signal switch connector set to operate at the switch mode.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A signal switch connector set, comprising:
  a first metal element electrically connected to a chip of a motherboard;
  a second metal element electrically connected to a first input/output (I/O) port of the motherboard;
  a first inserting element including a first conducting component, wherein when the first inserting element is inserted between the first metal element and the second metal element, the first conducting component electrically connects the first metal element and the second metal element to make the chip electrically connected to the first I/O port; and
  a second inserting element including a second conducting component connected to a signal line, wherein the signal line is connected to a second I/O port outside the motherboard, and when the second inserting element is inserted between the first metal element and the second metal element, the second conducting component electrically connects the first metal element and the signal line to make the chip electrically connected to the second I/O port.

2. The signal switch connector set according to claim 1, further comprising a first trace connecting the first metal element and the chip on the motherboard.

3. The signal switch connector set according to claim 1, further comprising a second trace connecting the second metal element and the first I/O port on the motherboard.

4. The signal switch connector set according to claim 1, wherein the first I/O port and the second I/O port are USB ports.

5. The signal switch connector set according to claim 1, wherein the first metal element and the second metal element are fixed on the motherboard via a surface mounted technology (SMT).

6. A motherboard, comprising:
  a chip generating a chip signal;
  a first trace whose first end is connected to the chip;
  a first I/O port;
  a second trace whose first end is connected to the first I/O port; and
  a signal switch connector set, including:
    a first metal element connected to a second end of the first trace;
    a second metal element connected to a second end of the second trace;
    a first inserting element including a first conducting component, wherein when the first inserting element is inserted between the first metal element and the second metal element, the first conducting component electrically connects the first metal element and the second metal element to transmit the chip signal to the first I/O port; and
    a second inserting element including a second conducting component connected to a signal line, wherein the signal line is connected to a second I/O port of the motherboard, and when the second inserting element is inserted between the first metal element and the second metal element, the second conducting component electrically connects the first metal element and the signal line to transmit the chip signal to the second I/O port.

7. The motherboard according to claim 6, wherein the first I/O port and the second I/O port are USB ports.

8. The motherboard according to claim 6, wherein the first metal element and the second metal element are fixed on the motherboard via a SMT.

9. A computer system, comprising:
an external I/O port;
a signal line whose one end is connected to the external I/O port; and
a motherboard including:
   a chip generating a chip signal;
   a first trace whose first end is connected to the chip;
   a first I/O port disposed at the motherboard;
   a second trace whose first end is connected to the first I/O port; and
   a signal switch connector set including:
      a first metal element connected to a second end of the first trace;
      a second metal element connected to a second end of the second trace;
      a first inserting element including a first conducting component wherein when the first inserting element is inserted between the first metal element and the second metal element, the first conducting component electrically connects the first metal element and the second metal element to transmit the chip signal to the first I/O port; and
      a second inserting element including a second conducting component connected to the signal line, wherein the signal line is connected to the external I/O port, and when the second inserting element is inserted between the first metal element and the second metal element, the second conducting component electrically connects the first metal element and the signal line to transmit the chip signal to the external I/O port.

10. The computer system according to claim 9, wherein the first I/O port and the external I/O port are USB ports.

11. The computer system according to claim 9, wherein the first metal element and the second metal element are fixed on the motherboard via a SMT.

\* \* \* \* \*